United States Patent
Horodezky et al.

(10) Patent No.: US 8,301,197 B2
(45) Date of Patent: Oct. 30, 2012

(54) METHOD AND APPARATUS FOR SYNCHRONIZING CONTACTS STORED ON SMART CARD WITH CONTACTS STORED IN AN INTERNAL MEMORY

(75) Inventors: Samuel J. Horodezky, San Diego, CA (US); Ankur Jalota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1118 days.

(21) Appl. No.: 11/941,954

(22) Filed: Nov. 18, 2007

(65) Prior Publication Data

US 2009/0131028 A1  May 21, 2009

(51) Int. Cl.
*H04M 3/00* (2006.01)
*H04M 1/00* (2006.01)

(52) U.S. Cl. .......................... 455/558; 455/418
(58) Field of Classification Search .................. 455/418
See application file for complete search history.

(56) References Cited

U.S. PATENT DOCUMENTS

| | | | |
|---|---|---|---|
| 7,120,636 B2 | 10/2006 | Pendleton | |
| 2002/0169004 A1 | 11/2002 | Thil et al. | |
| 2003/0105847 A1* | 6/2003 | Jennery et al. | 709/223 |
| 2006/0154656 A1 | 7/2006 | Nicolas et al. | |
| 2007/0220022 A1 | 9/2007 | Lankinen et al. | |
| 2009/0216748 A1* | 8/2009 | Kravcik | 707/5 |

FOREIGN PATENT DOCUMENTS

| | | |
|---|---|---|
| EP | 1143357 A2 | 10/2001 |
| EP | 1259089 A1 | 11/2002 |
| EP | 1681839 A1 | 7/2006 |
| GB | 2313736 | 12/1997 |
| JP | 2001014328 A | 1/2001 |
| JP | 2006197604 A | 7/2006 |
| JP | 2007060231 A | 3/2007 |
| JP | 2007288606 A | 11/2007 |

OTHER PUBLICATIONS

European Search Report—EP08103036—Search Authority—Munich—Feb. 26, 2011.
International Search Report and Written Opinion—PCT/US2008/083917, International Search Authority—European Patent Office—Feb. 27, 2009.

* cited by examiner

*Primary Examiner* — Charles Appiah
*Assistant Examiner* — Natasha Cosme
(74) *Attorney, Agent, or Firm* — James T. Hagler

(57) ABSTRACT

A mobile handset includes a processor configured with software to automatically synchronize the phone book records stored on a smart card and internally in memory. The synchronization process determines if duplicate contact records exist in the target phone book, and whether the synchronization copies records from the smart card to internal memory, or vice versa, before copying contact records. If a duplicate contact record exists, then the copying process is cancelled. The synchronization process may be automatically initiated any time the contact records in the internal memory and the smart card differ.

22 Claims, 13 Drawing Sheets

METHOD AND APPARATUS FOR SYNCHRONIZING CONTACTS STORED ON SMART CARD WITH CONTACTS STORED IN AN INTERNAL MEMORY

FIELD OF THE INVENTION

The present invention relates to cellular telephone handset devices, and more particularly to mobile handset devices configured to synchronize personal contact data stored on a smart card with data stored in memory.

BACKGROUND

As the processing power of mobile communication devices continues to increase, the applications available on mobile communication devices continue to grow. One of the most valuable applications available to owners of mobile communication devices is the phone book or contacts application. The phone book of a user's contacts allows a user to store the contact information for the user's family, friends, associates, clients, vendors, providers, business contacts, etc. in the internal memory of the mobile communication device. Often times, owners who lose their mobile communication device lament the loss of the valuable contact information contained in the phone book application more than the loss of the equipment.

A smart card, such as Subscriber Identity Module (SIM) card, is a portable memory chip used in some models of mobile communication devices, specifically those of the Global System for Mobile Communications (GSM) variety. The smart card acts as a portable memory unit that may be removed from the mobile communication device and placed into a second mobile communication device. Often times the smart card is used to store a second copy of the user's phone book data that is otherwise stored in the internal memory of the mobile communication device. By storing a user's phone book to the smart card, the user can easily transfer the phone book information from one mobile communication device to another. To do so, the user simply slides the SIM card out of the old mobile communication device and into the new mobile communication device. Once the smart card is inserted into the new mobile communication device all of the necessary personal and provisioning data is immediately accessible to the processor contained in the new mobile communication device.

Smart card phone books do suffer some disadvantages. One disadvantage is that their data and file structures have not evolved to keep pace with applications which have been developed to capitalize on the processing power and storage capacity of mobile communication devices. For example, many smart cards are only able to store a single contact number per contact name. Thus, if an individual contact has multiple contact numbers, the smart card stores multiple entries for the individual treating each contact number for the same contact as a separate and new contact.

When mobile communication devices first entered mainstream society, it was common for a person to have only one contact number, namely a home telephone number. As such, data and file structures for early phone book application only had to account for a single contact number per person. However, in today's society, it is not uncommon for a single person to have multiple avenues of contact. For example, a single person may have a home phone number, office phone number, cellular telephone number, pager number, fax number, e-mail address, SMS message address, etc. Accordingly, current phone book applications for mobile communication devices have grown and expanded in their ability to store not only more contact data per person, but also a wider variety of data types. Despite the advancement of phone book applications, smart card data and file structures very often operate on the old data structures. Consequently, the discrepancy in data and file structures between the smart card and applications running on the mobile communication device limit the capacity to synchronize phone book information stored in the internal memory of the mobile device with phone book information stored on the smart card.

Another disadvantage of smart cards is that when a user enters a new contact number, edits a contact number or deletes a contact number, typically only the phone book data stored in internal memory is modified. In order to modify the phone book stored on the smart card, the user must actively synchronize the phone book data stored in internal memory with the phone book data stored on the smart card. If the user fails to initiate this synchronization, the smart card phone book will not be current.

Another disadvantage is evident when the user attempts to synchronize the phone book data stored in internal memory with data stored on the smart card. Conventional synchronization processes simply copy all of the contact information that exists in the source phone book data fields (either the internal phone book or smart card phone book) to the target phone book data fields (either the internal phone book or smart card phone book) regardless of whether the contact information already exists in the target phone book data fields. As a result, the target phone book data stored in either the internal memory of the mobile device or the smart card may contain duplicate information.

SUMMARY

The various embodiments provide methods for automatically synchronizing the phone book or contact information stored in an internal memory of a mobile device with similar data stored on a smart card. A mobile device can be configured with software to automatically update both the internal memory phone book and phone book data stored on a smart card whenever there is a discrepancy between the two. The mobile device may also be configured with software which analyzes the contact information stored in both the internal memory phone book and smart card phone book to insure that duplication of information is avoided.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
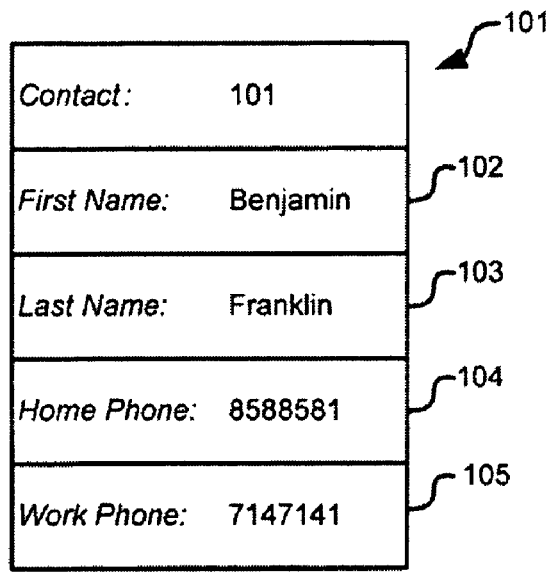
FIG. 1a is a data structure diagram which illustrates the contact record fields available to an internal phone book contact record.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Descriptions of the various embodiments may refer to a smart card or SIM card but the embodiments are equally applicable to equivalent memory cards and modules. The equivalent of a smart card or SIM in the Universal Mobile Telecommunications System (UMTS) is called the Universal Integrated Circuit Card (UICC), and equivalent of a smart card or SIM in Code Division Multiple Access (CDMA) phones is the Removable User Identity Module (R-UIM). As will be obvious to one of skill in the art, the various embodiments may be applied to any form of smart card, including for example, secure digital (SD) and flash memory cards. For sake of simplicity, reference will be made to a generic smart card or SIM card, but such references are not intended to limit the scope of the invention or claims.

As used herein, the terms "mobile device", "mobile handset", "handset" and "handheld device" refer to any one or all of cellular telephones, personal digital assistants (PDAs) with wireless modems, wireless electronic mail receivers (e.g., the Blackberry® and Treo® devices), multimedia Internet enabled cellular telephones (e.g., the iPhone®), and similar personal electronic devices which use a SIM card or its equivalent. In a preferred embodiment, the mobile device is a cellular handset device (e.g., a cellphone) that includes a phone book application. However, cellular telephone communication capability is not necessary as the various embodiments may be used to backup data stored on a variety of memory chips as may be used in other personal electronics.

As used herein, the term "phone book" refers to the collection of contact information for each of a user's contacts. Those contacts may include family, friends, associates, clients, vendors, providers, business contacts, businesses (e.g., restaurant) etc. The contact information may include phone numbers, fax numbers, pagers, physical addresses, e-mail addresses, website addresses, specific ringtone associated with a caller, picture ID associated with a caller, etc.

One of the most popular and often used mobile applications is the phone book function, used for storing contact information in the internal memory of the mobile communication device. To initialize the phone book application, a user must physically enter all relevant contact information for each of the user's contacts. This may be accomplished in a variety of well-known ways including the synchronization with a personal computer, infrared uplinks, Bluetooth or WiFi uplinks as well as manually entering information through the mobile device's user interface. The contact information is stored in an internal memory of the mobile device which is readily accessible by the mobile device's processor.

A contact record may be generated for each individual contact. The contact record stored in the internal memory of the mobile device may include multiple data fields for storing multiple contact numbers (e.g., numbers for cellphones, home phones and work phones) and addresses (e.g., home address, work address, vacation address, etc.).

Smart cards, such as a SIM, are often used to store a portable copy of contact records, such as to enable moving phone book data records to a new mobile device or as a back up. This portability of the smart card is especially useful as a user upgrades his/her mobile device equipment but does not wish to go through the trouble of manually entering in all of his/her contact information. Rather, the user may simply remove the smart card from the older mobile device and insert the smart card into the upgraded mobile device. In this manner, all of the information stored on the smart card may be made available to the user of the newer mobile device.

In order for a smart card to be used as a back up to the phone book records stored in internal memory of a mobile device, the information stored in the smart card must be kept current with the information stored in the mobile device. To insure that the contact information stored in both the internal phone book and the smart card phone book is accurate and up to date, users often perform a synchronization process which transfers all of the contact information from the internal memory phone book to the smart card phone book and vice versa. This may be accomplished by initiating an application that copies files from one memory to the other. When a user updates an internal memory phone book with contact information stored in the smart card, the smart card is referred to as the source phone book and the internal memory phone book is referred to as the target phone book, and vice versa. Thus, the contact information found on the source phone book is copied to the target phone book.

One of the problems with synchronizing the phone book stored in the internal memory with that stored in a smart card is that the data and file structures of each memory are different from one another. Specifically, most current phone book applications that store contact information in an internal memory allow a user to store multiple contact numbers and information per contact. In other words, a user may store a home number, a work number, a mobile number, a fax number, a specific ringtone, photo or picture ID, etc. for each contact name. In contrast, the data and file structure of the smart card only allows a user to store a single contact number for each contact name.

As typically formatted, a smart card includes data fields for a contact name, which may vary in size from 0 to Y characters. This data field is optional, meaning it may not be available on some smart cards. If it is available, then the mobile device must dynamically determine the length of the name stored in the contact name data field before writing any contact information into the smart card phone book record. The smart card also includes a data field for a contact number. The smart card contact number data field can store at least 20 digits. Soft pauses and wildcard characters may be stored as well. Typically, timed and hard pauses cannot be stored, so each must be converted into a single soft pause. In smart card memory, all symbols and spaces count as a digit, except for "+", which is a free symbol. That is to say, the "+" does not count against the 20 digits that are allotted to the contact number data field. Only a single contact number data field can be associated with each contact name data field. Thus, if multiple contact numbers exist for each contact, multiple contact entries must be created for each individual contact.

Another problem with conventional synchronization procedures is that typically when implemented, all of the contact information that is contained in the source phone book is copied to the target phone book, regardless whether a contact record with a particular contact number already exists. Consequently, the target phone book may be loaded with duplicate information.

FIG. 1a illustrates an example of a contact data record stored in a phone book within the internal memory of a mobile device. As shown, the phone book contact record 101 includes a first name data field 102 and a last name data field 103. Thus, a user may store each contact by first name and by last name. The phone book contact record 101 may also include a home number data field 104 and a work number data field 105.

Figure 1B:
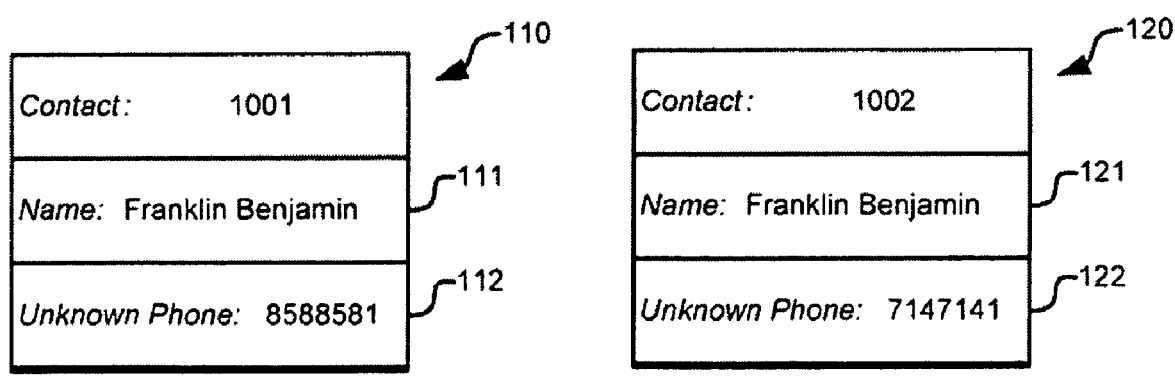
FIG. 1b is a data structure diagram which illustrates the contact record fields available to a smart card phone book contact record.

In contrast, FIG. 1b illustrates an example of a contact data record of a smart card phone book 110. As shown in FIG. 1b, each contact record only records a single name data field 111, thus both first and last names are stored as concatenated data in the single data field. In addition, each contact data record only provides for a single contact number data field 112. Thus, in order to store both a home number and a work number for a particular contact, two separate phone data records with the same entry in the name data field must be generated in the smart card phone book data file. Consequently, when a smart card is inserted into a mobile device and the phone book data stored thereon are synchronized with the phone book data stored in internal memory, typically multiple contact records are created for each contact number, even if the contact numbers are merely multiple contact numbers for the same contact name entry. As will be appreciated by one of skill in the art, a phone book contact data record 101 may include other data fields, such as an independent key or index value, ringtones, photo IDs, and metadata that are not shown in FIG. 1B.

In addition, redundant entries may be created as most conventional synchronization operations merely copy all of the contact information stored on the smart card to the internal memory or vice versa, regardless whether a particular contact record or contact number already exists.

The various embodiments described herein overcome the forgoing disadvantages by providing a method and device for automatically synchronizing the phone book stored in internal memory and the phone book stored in a smart card.

To facilitate the descriptions of the various embodiments, when a phone book data file is copied from one memory to another, the data file that is being copied is referred to herein as the "source phone book data file," and the data file to which the data is being copied is referred to herein as the "target phone book data file."

Figure 2:
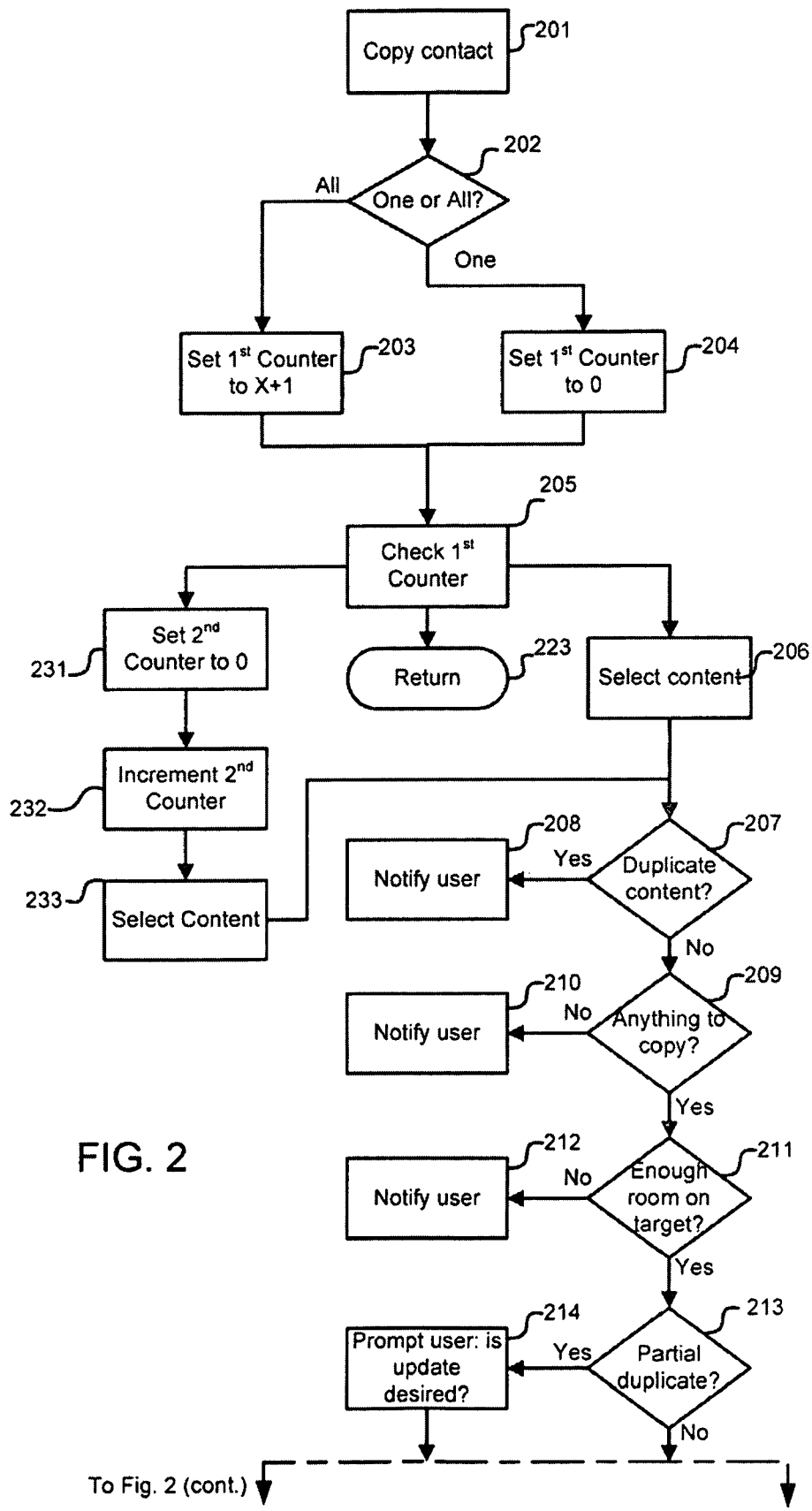
FIG. 2 is a process flow diagram of an embodiment method suitable for implementation on a mobile device.
Figure 2:
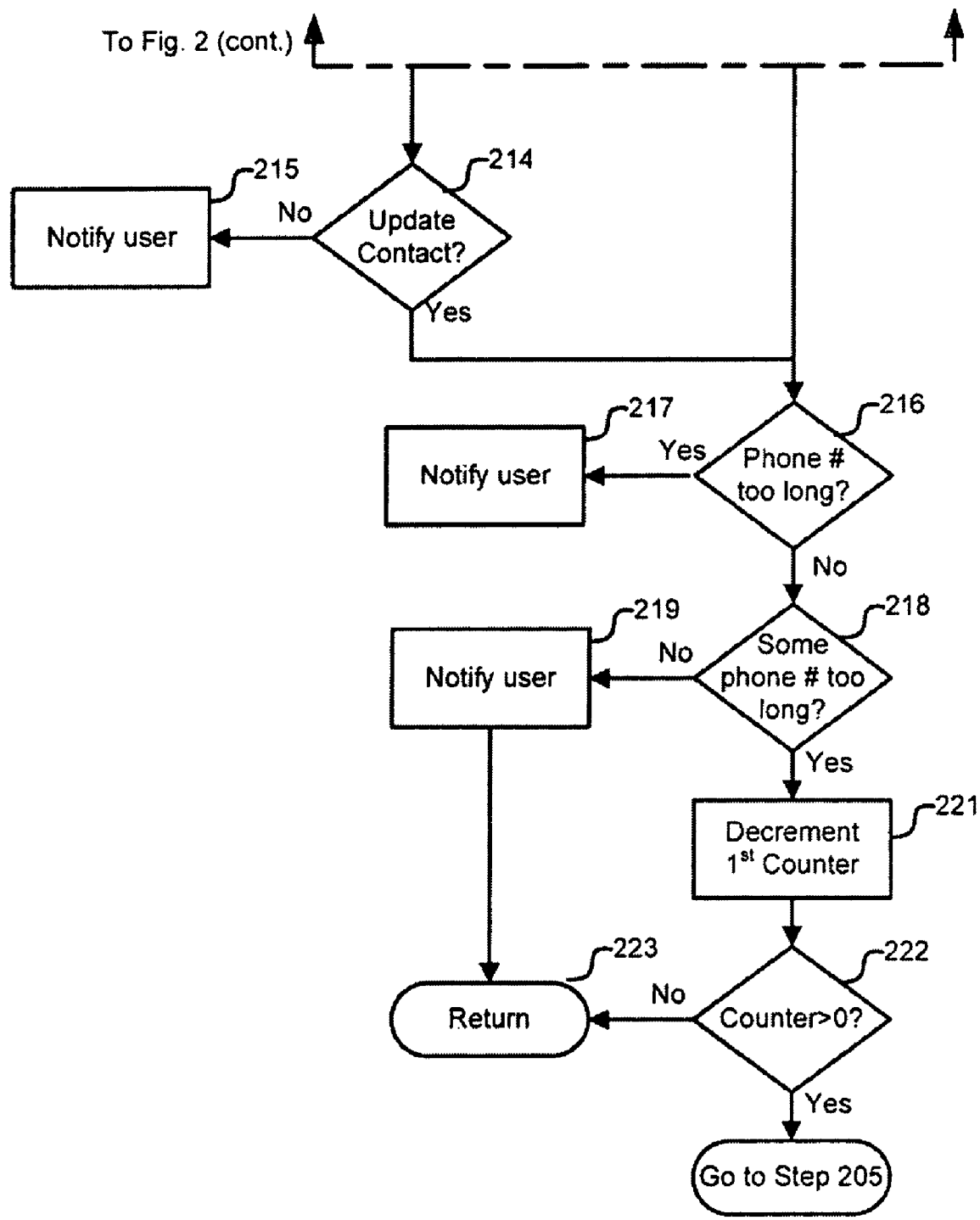

FIG. 2 illustrates example process steps involved in copying a new contact record from a source phone book data file to a target phone book data file. A processor coupled to a memory unit which contains processor readable software instructions may execute the synchronization process. The processor may also generate audible and visual messages for the user via a coupled user interface which may include a display and speaker to inform the user as to the status of the process. The processor may also receive commands from the user via various input devices and the user interface.

After storing the new contact record to the source phone book data file, the user may select a "copy to target phone book" option from an options menu on a user interface presented on the mobile device, step 201. This user interface menu may be generated by an application running on the processor of the mobile device which is configured with software to generate the menu display for presentation on a screen or display. This options menu may prompt the user to select either "one contact" or "all contacts" to determine when a single or all records are to be copied, step 202. If the user selects "one contact" in step 202, a first counter may be set to "0", step 204. The processor may then tests the first counter value to determine whether a single contact record from a source phone book data file should be copied to a target phone book data file or if all of the contact records stored in all source phone book data files should be copied, step 205.

If the counter equals zero, then the processor generates an options menu display which prompts the user to select a particular contact record to copy from the source phone book data file to the target phone book data file, step 206. The processor then determines if the newly added contact record is actually a new record to the target phone book or if the newly added contact record is a duplicate, step 207. This determination is described in more detail below with reference to FIGS. 4 and 5. If the selected contact record is deemed to be a duplicate contact record, the processor generates an options menu via the user interface which notifies the user that such duplication exists, step 208. The processor then decrements the first counter value, step 221. The processor then tests the first counter value to determine whether the copy process should be repeated for other contact records or if the process is complete, step 222. If the first counter value is less than or equal to zero, then the processor returns to a standby state to await the next request to copy contact information from the source phone book data file to the target phone book data file, step 223.

If the selected contact record is deemed to be a new contact record (i.e., non-duplicate), then the processor determines if there is anything to copy, step 209. Since the target phone book data files may only have fields for a single contact name and single contact number, some target phone book data files cannot accept contact information such as e-mail addresses, website addresses, instant messaging addresses, etc. which are text based. Such text-only contact information is ignored when storing contact information to such a target phone book data file. Thus, in instances where the user attempts to copy from an phone book stored in internal memory (source) to a phone book stored in a smart card (target) it is necessary to determine whether the contact record data is suitable data to copy. The processor then decrements the first counter value, step 221. The processor then tests the first counter value to determine whether the copy process should be repeated for other contact records or if the process is complete, step 222. If the first counter value is less than or equal to zero, then the processor returns to a standby state to await the next request to copy contact information from the source phone book data file to the target phone book data file, step 223.

If the selected contact record stored in the phone book stored in internal memory only contains a contact name and some other text-based-only contact information, the user will be notified that there is nothing to copy to the phone book stored on the smart card, step 210. While step 209 is necessary when the source phone book is the phone book stored in internal memory and the target phone book is the phone book stored on the smart card due to the data field limitations on the smart card, such a step is not necessary and may be omitted when the target phone book is the phone book stored in internal memory. Nevertheless, if step 209 is performed when the target phone book is the phone book stored in internal memory, the results of the step will always indicate that there is data to copy as any data stored on the smart card may be copied to the phone book in the internal memory.

If the new contact record is not a duplicate, (i.e., step 207="NO"), and there is contact information to copy, (i.e., step 209="YES"), then the processor will determine if there is enough memory space available on the target phone book to accept the new data, step 211. If there is not enough memory space available to accept new data, the user will be notified via the user interface, step 212. The processor then decrements the first counter value, step 221. The processor then tests the first counter value to determine whether the copy process should be repeated for other contact records or if the process is complete, step 222. If the first counter value is less than or equal to zero, then the process returns to a standby state to await the next request to copy contact information from the source phone book data file to the target phone book data file, step 223.

If there is sufficient memory space on the target phone book, (i.e., step 211="YES") then the processor may determine if the selected contact record is a partial duplicate, step 213. This determination is described in more detail below with reference to FIGS. 4 and 5. When the source phone book is the smart card and the target phone book is the phone book stored in the internal memory it is necessary to determine whether the contact entry is a partial duplicate or not. While the contact record on the smart card may be a duplicate of one contact number associated with a contact name on the internal memory phone book, it may not be a duplicate of all numbers associated with a contact stored in the mobile device phone book file. However, in instances where the phone book stored in the internal memory is the source, the contact record will either be a complete duplicate or not. This is the case, as contact record files on the phone book on the smart card only contain a single field for both the contact name and the contact number. Consequently, while step 213 is necessary when the source phone book is the phone book stored on the smart card and the target phone book is the phone book stored in internal memory due to the multiple data fields on the phone book stored in internal memory, such a step is not necessary and may be omitted when the target phone book is the phone book stored on the smart card. Nevertheless, if step 213 is performed when the target phone book is the phone book stored on the smart card, the results of the step will always indicate that there is a duplicate contact record or not, just as in step 207.

Figure 10:
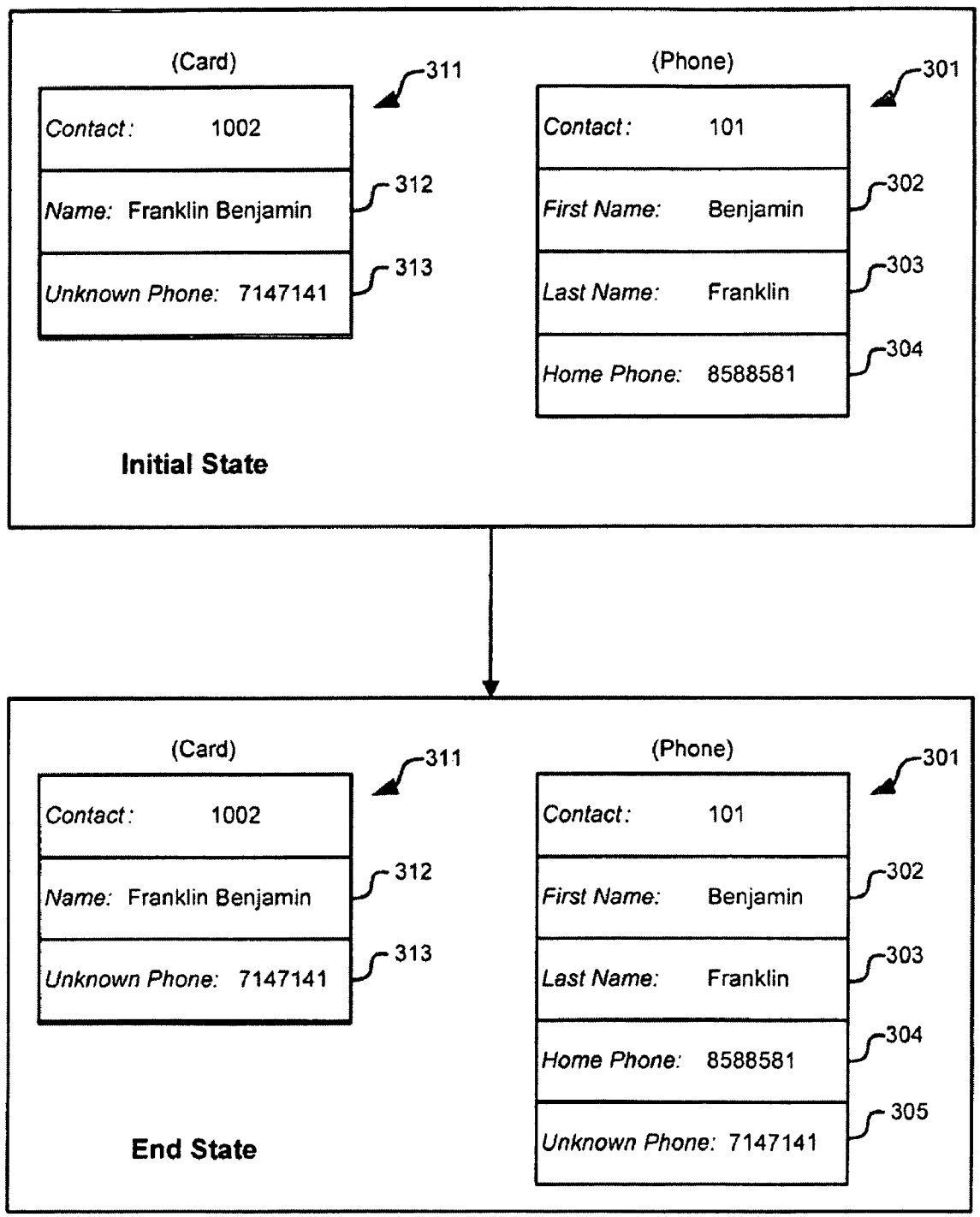
FIG. 10 is a process flow diagram of an embodiment method suitable for implementation on a mobile handset where an partial duplicate contact record is copied into the contact record stored in internal memory.

If the selected contact record is a partial duplicate (i.e., step 213), the user may be notified via the user interface, display and speaker as such and may be prompted via the user interface, display and speaker to select whether the user wishes to update the contact record on the target phone book (internal phone book), step 214. If the user elects to update the contact record on the target phone book (internal phone book), the unknown contact number associated with the contact name on the smart card phone book is merged with the contact record for the matched contact name on the internal phone book as an "unknown phone." FIG. 10 illustrates the merge operation of a partial duplicate. As shown in FIG. 10, if the converted name fields result in a match then the new and unknown contact number ("7147141") stored in the contact number field 313 is "merged" into the contact record 301 on the internal memory as an "unknown phone" 306.

If the user declines to update the contact record on the target phone book, then the copy function is cancelled, step 215. The processor then decrements the first counter value, step 221. The processor then tests the first counter value to determine whether the copy process should be repeated for other contact records or if the process is complete, step 222. If the first counter value is less than or equal to zero, then the process returns to a standby state to await the next request to copy contact information from the source phone book to the target phone book, step 223.

If the processor determines that the selected contact record is not a partial duplicate in step 213 or if the selected contact record is determined to be a partial duplicate in step 213 and the user elects to update the contact record on the smart card via the user interface in step 214, the processor determines if the contact number associated with the selected contact record is too long to be stored in the target phone book, step 216. Since the smart card contact number field may only accept up to 20 digits, some contact numbers associated with a contact record may be too long to be stored on the smart card. Some users may wish to store pauses and wildcards so that automated voice mail services or the like can be accessed simply by activating a single contact record contact number. Such capabilities are available to the internal phone book application, but are limited on a smart card phone book due to the length of the contact number field.

If all of the contact numbers associated with the selected contact record are too long for storage on the smart card, the user is notified via the user interface, step 217. In instances where the user attempts to copy a contact record from the smart card to the internal phone book, step 216 is unnecessary as all data capable stored on the smart card can be stored in the internal phone book data file. Thus, this step 216 may be omitted when copying a contact record from the smart card to a target internal phone book. On the other hand, the process step may be completed since the result of the step will always allow the contact record to be stored when the target is the internal phone book.

After the contact record has been stored to the target phone book data file, the processor then decrements the first counter value, step 221. The processor then tests the first counter value to determine whether the copy process should be repeated for other contact records or if the process is complete, step 222. If the first counter value is less than or equal to zero, then the process returns to a standby state to await the next request to copy contact information from the source phone book to the target, step 223.

If the counter value is greater than zero, the processor determines whether only some of the contact numbers associated with the selected contact record are too long for storage on the smart card, step 218. Because the internal phone book may store multiple contact numbers for each contact record, some of the contact numbers associated with the contact record may be too long for storage to a smart card, while others may not. If some of the contact numbers are too long for storage on the smart card, only those numbers short enough to be stored to the smart card will be copied to the smart card, step 219. The processor then decrements the first counter value, step 221. The processor then tests the first counter value to determine whether the copy process should be repeated for other contact records or if the process is complete, step 222. If the first counter value is less than or equal to zero, then the process returns to a standby state to await the next request to copy contact information from the source phone book to the target phone book, step 223.

If all of the contact numbers associated with the selected contact record are short enough for storage on the target phone book, then all of the contact numbers associated with the selected contact record will be copied to the target phone book, step 220. Once all of the contact numbers associated with the selected contact record have been copied to the target phone book data file, the processor then decrements the first counter value, step 221. The processor then tests the first counter value to determine whether the copy process should be repeated for other contact records or if the process is complete, step 222. If the first counter value is less than or equal to zero, then the process returns to a standby state to await the next request to copy contact information from the source phone book data file to the target phone book data file, step 223.

If in step 202 above, the user elects to "copy all" contacts, a first counter is set to X+1, where X equals the total number of contact records stored in the source phone book, step 230. Next the first counter value is checked, step 205. If the first counter value is greater than "1", a second counter value is set to "0", step 231. If the first counter value equals "1" then the process returns to a standby state to await the next request to copy contact information from the source phone book to the target phone book, step 223.

If the first counter value is greater than "1", the second counter value is incremented, step 232, and the value of the second counter is used to select a contact record, step 233. For example, if the value of the second counter value is "1," then the first contact record stored in the internal memory is selected. If the value of the second counter value is "2," then the second contact record stored in the internal memory is selected. Once the contact record is selected in step 233, the processor continues to process through steps 207-220 as described above. If in step 222, the first counter value is greater than "1", the processor returns to step 205 to check the value of the first counter value and proceeds with the steps as above.

Figure 3:
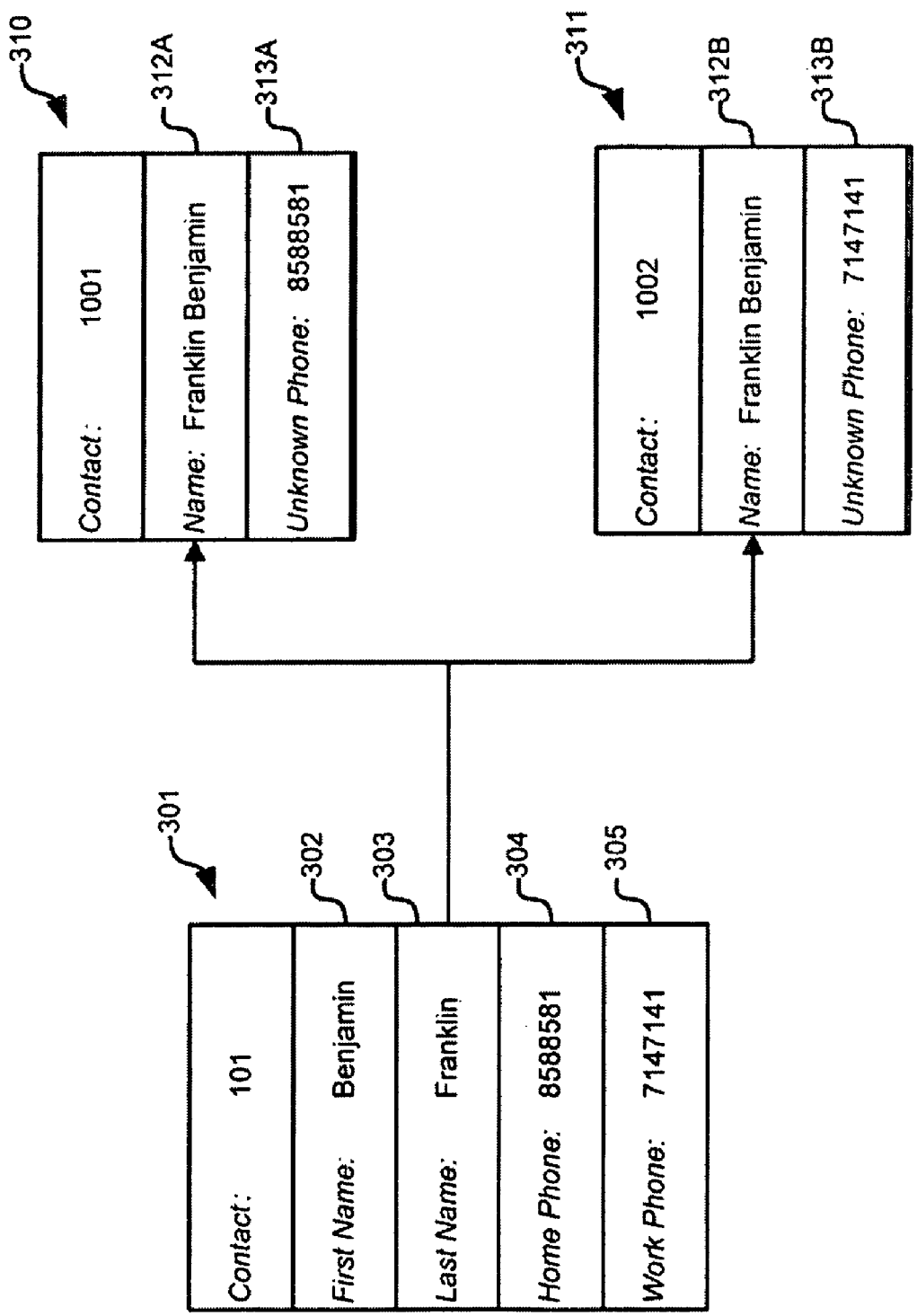
FIG. 3 is a process flow diagram of an embodiment method suitable for implementation on a mobile handset where an internal phone book contact record is copied to a smart card phone book.

FIG. 3 illustrates the multiple contact records that are created on the smart card when the selected contact data record contains more than one contact number. A selected contact record 301 exists in the internal phone book. The exemplary selected contact record 301 includes a data field for the selected contact first name 302 "Benjamin" as well as a data field for the selected contact last name 303 "Franklin." In addition, the internal phone book allows for multiple contact numbers 304, 305 associated with the selected contact name. These may be denoted as "Home Phone" 304 and "Work Phone" 305. When the selected contact record is selected for copying to a smart card, a separate entry is created in the smart card phone data file for each contact number 304, 305. The separately created entries are shown in FIG. 3 as smart card contact records 310, 311. In addition, because the smart card only contains a single name field, the first and last name fields, 302 and 303 respectively are combined into a single name field 312*a* and 312*b* that is the same for both newly created contact records on the smart card. Since the smart card only contains a single field for an associated contact number, there is no distinction as to which contact number is saved. Thus, the contact number data fields stored on the smart card are denoted "unknown phone" 313*a* and 313*b*.

Figure 4:
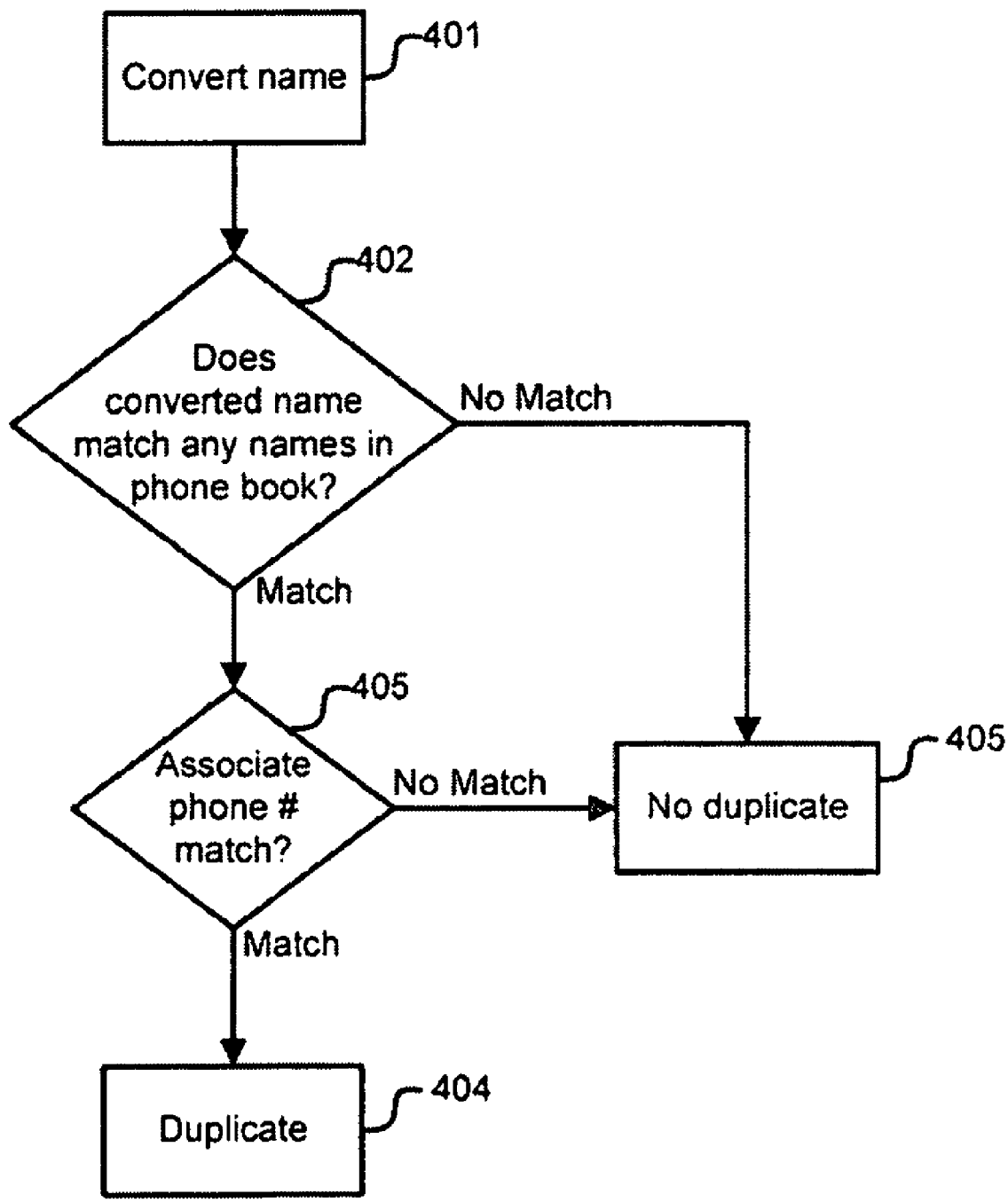
FIG. 4 is a process flow diagram of an embodiment method suitable for implementation on a mobile handset to determine whether a contact record is a duplicate.

FIG. 4 illustrates process flow steps that may be implement when the copy function copies a contact record from an internal phone book (source) to a smart card (target) to determine whether the selected contact record is a duplicate contact record. As shown in FIG. 4, the processor first converts the selected contact name into a smart card format, namely a single data field wherein the last name 303 is followed by the first name 302 with a single space between them to generate a single name format as shown in FIG. 3, reference numeral 312 above, step 401. Next the converted selected contact name from the internal phone book data file is compared against all names 312 stored in the smart card phone book data file, step 402. The converted contact name in smart card format may be temporarily stored in a buffer or other similar location during the comparison step. If any character between the converted selected name differs from the names stored in the phone book data file on the smart card, then a match does not exist and the contact record is deemed to not be a duplicate, step 405. If the selected converted name stored in the internal phone book data file matches the name associated with the matched contact number above stored on the smart card identically, then a match exists.

If a name match exists, then the processor determines whether a contact number associated with the converted selected contact name stored in the smart card is identical to the contact number associated with the matched contact name, 403. To do so, each of the contact numbers associated with a converted selected contact name in the internal phone book data file are stored in a temporary buffer or similar temporary memory location and compared with the contact number associated with the matched contact name stored on the smart card. If at least one of the contact numbers are identical—or if the only difference between the numbers is that a hard pause on the internal phone book contact record is replaced by a soft pause on the smart card phone book contact record—then the numbers are considered a match. A match identifies the contact record as a duplicate, step 404. Otherwise, the numbers are not considered a match, including situations in which the numbers differ only by pauses. Wildcards are not processed in the matching process, except that two numbers with the same wildcards in the same positions are considered a match. If the contact number associated with the converted selected contact name do not match with any of the contact numbers associated with the matched contact name above, then the contact record is not identified as a duplicate, step 405.

If only some of the contact numbers associated with the contact record in the internal memory are matched, but not all, then a partial duplicate is determined. In such an instance new contact records may be generated on the smart card and each of the unmatched contact numbers may be written to the newly generated contact records, see step 217. If all of the contact numbers associated with the selected converted contact name are considered a match, then the method deems the contact numbers to be duplicates and the user is duly notified via the user interface, display and/or speaker, step 205.

If none of the numbers associated with the selected converted contact name are considered a match, then the processor may generate a new contact record in the smart card and write each of the unmatched contact numbers to the newly generated contact records, see step 217 above. If all of the contact numbers associated with the selected converted contact name are considered a match, then the method deems the contact numbers to be duplicates and the user is duly notified via the user interface, step 205.

Figure 5:
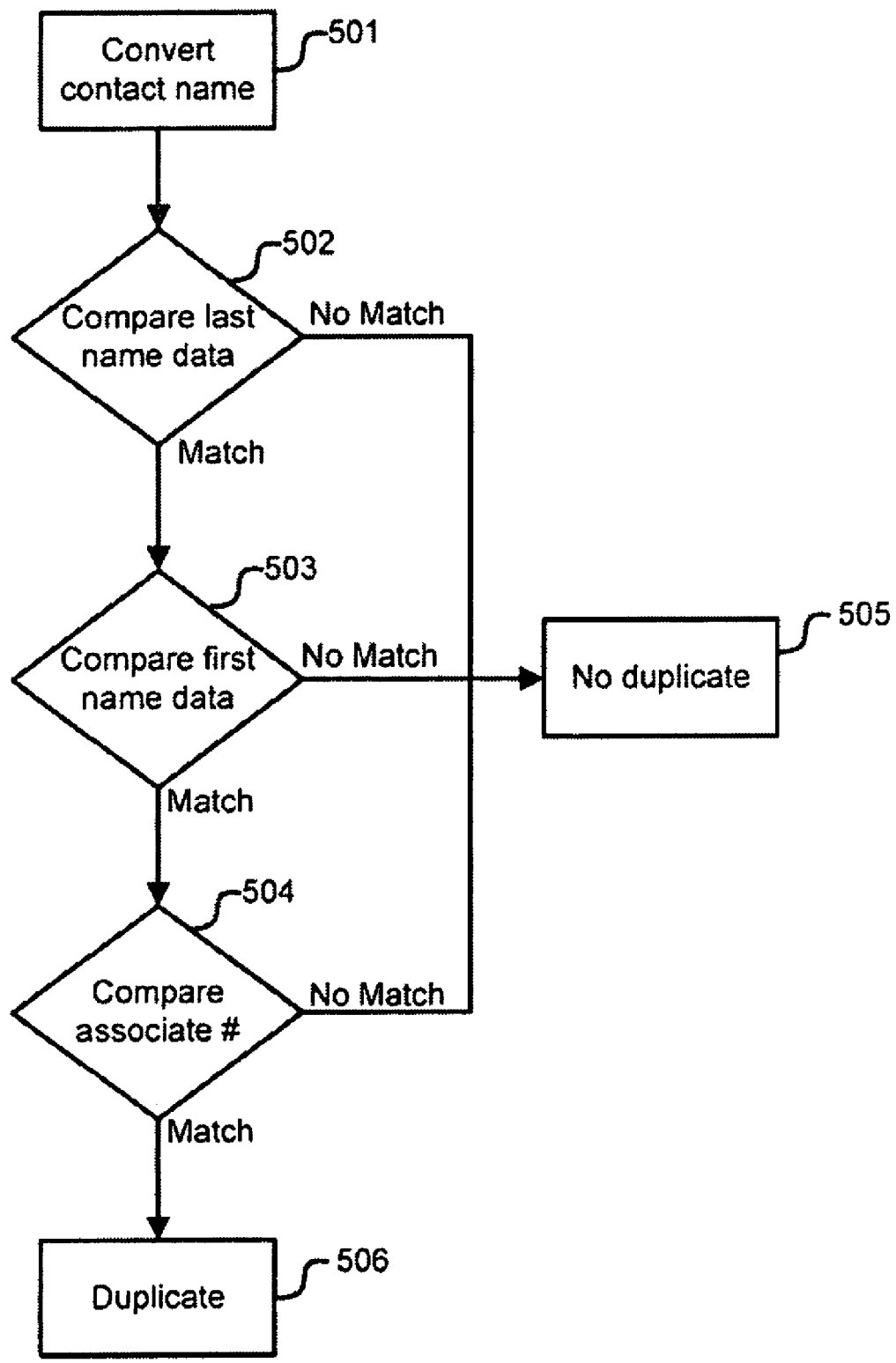
FIG. 5 is a process flow diagram of an alternative embodiment method suitable for implementation on a mobile handset to determine whether a contact record is a duplicate.

FIG. 5 illustrates the process flow steps that may be implemented when the copy function copies a contact record from a smart card phone book (source) to an internal phone book (target) to determine whether the selected contact record is a duplicate contact record. As shown in FIG. 5, the processor may first convert the selected contact name into an internal phone book format, step 501. Specifically, the processor divides the single name field 312 stored in the smart card into two separate data fields, one for last name 303 and one for first name 302. The first complete word before any space may be assumed to be the entry into the first name data field 302. The remaining contact name entry after a space may be assumed to be the last name field 303. Alternatively, the processor may assume the opposite to accommodate data schemes in which the last name is stored first. In still other embodiments, the single name field 312 stored in the smart card phone book is simply copied to the last name data field 303. The converted contact name fields are stored in a temporary buffer or similar temporary memory location. Next the converted last name data field 303 from the smart card is compared against all entries in the last name data field 302 stored in the internal memory, step 502. If any entry in the last name data field in the internal memory differs from the entry in the last name data field of the selected entry stored in the phone book data file on the smart card, then a match does not exist and the contact record is deemed to not be a duplicate, step 505. The processor may generate a new contact record with the data from the smart card contact record. The converted last name is placed in the last name data field 303, and the converted first name is placed in the first name data field 302. The contact number is placed in a data filed for "unknown phone."

If the converted last name data field 303 matches any last name data field on the phone book stored in the internal memory, then the converted first name data field 302 is compared to each of the first name data fields associated with the previously matched last name, step 503. If any character in the first name data field in the internal memory differs from the first name data field of the selected entry stored in the phone book on the smart card, then a match does not exist and the contact record is deemed to not be a duplicate, step 505. The processor may generate a new contact record with the data from the contact record stored in the smart card. The converted last name entry is placed in the last name field 303. The converted first name entry is placed in the first name field 302. The contact number is placed in a field for "unknown phone." Alternatively, in embodiments where the single contact name field 312 is copied into the last name data field 303, only the single name is compared.

If the converted first name field 302 matches any first name field on the internal phone book, then the contact number 313 associated with the contact entry on the smart card is stored in the temporary buffer or similar temporary memory unit and compared with each of the multiple contact associated with contact entry stored on the internal memory, step 504. If the numbers of the contact number associated with the contact entry on the smart card are identical to any of the multiple contact number associated with the contact entry on the internal phone book—or if the only difference between the numbers is that a hard pause on the internal phone book contact record is replaced by a soft pause on the smart card phone book contact record—then the numbers are considered a match, step 506. If the number associated with the contact name from the smart card matches the number associated with the contact record on the internal memory, then a duplicate is determined and the copy function is cancelled, step 505.

Otherwise, the numbers are not considered a match, including situations in which the numbers differ only by pauses. Wildcards are not processed in the matching process, except that two numbers with the same wildcards in the same positions are considered a match. If none of the numbers associated with the selected converted contact name are considered a match, then the method may copy the contact number from the smart card into a field for "unknown phone" on the contact record stored in the internal memory.

In an alternative embodiment, a smart card with various contact records already stored therein may be inserted into a mobile device. When the smart card is inserted into the mobile device, a sensor may detect the new smart card device and automatically initiate a synchronization procedure. In order to properly synchronize the internal phone book with the smart card phone book, the "copy all" procedure described above with reference to FIG. 2 may be initiated for both the internal phone book data file as a source and then as a target. In this manner, all of the phone book data stored in the internal memory will be transferred to the smart card without duplication and all of the contact data stored on the smart card will be copied to the internal memory phone book without duplication. In this manner, a user can be assured that both the smart card and internal memory contain a complete and accurate copy of all of the user's contact information. It should be noted that the copy procedure may copy the internal phone book to the smart card first and then the smart card phone book to the internal phone book or vice versa. The order of copying should not matter.

Figure 6:
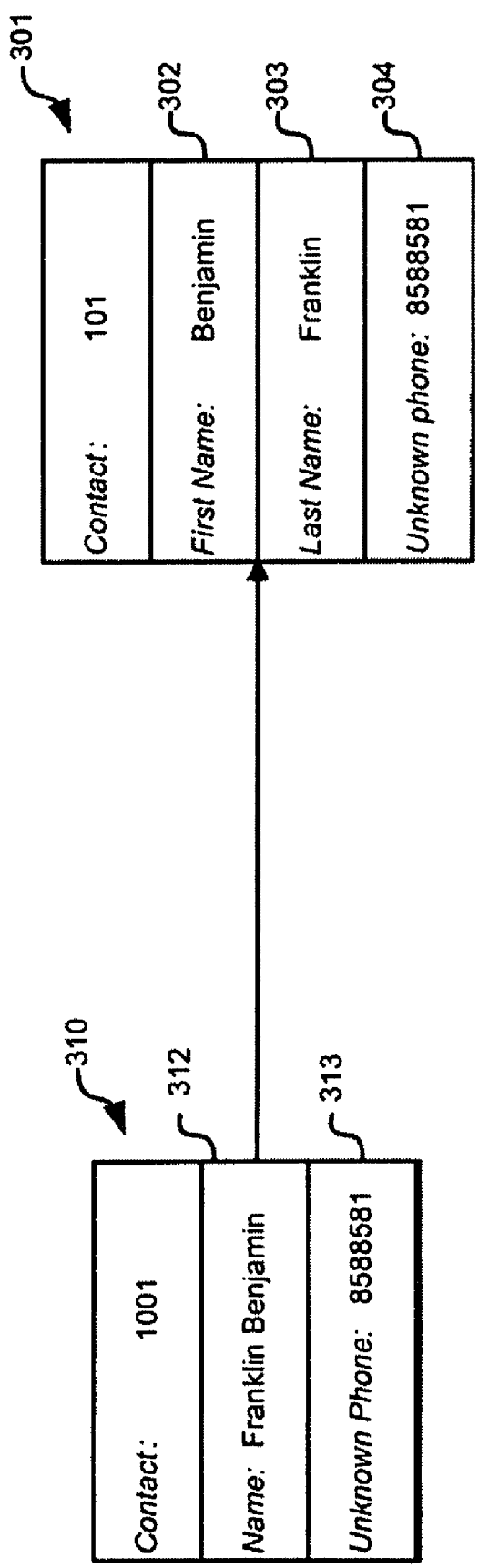
FIG. 6 is a process flow diagram of an alternative implementation of the methods illustrated in FIG. 2 through 5 suitable for implementation on a mobile device.

FIG. 6 illustrates the process flow that occurs when a new contact is added to the smart card. As soon as the new contact record is added to the smart card, the synchronization process described above is initiated. Assuming that the new contact record entered on the smart card does not already exist in the internal memory phone book, a new contact record is created in the internal memory phone book. As shown in FIG. 6, the contact record on the smart card contains a single field 312 for the contact name containing both the first and last name of the contact. In addition, the contact record on the smart card contains a single contact number field 312 which is denoted as an "unknown phone." Once the smart card containing the new contact record is inserted into the mobile device, the synchronization process may be initiated. When the synchronization process generates the new contact record in the internal phone book, the entry in the name field 312 will be copied into the last name data field 303. In addition, the entry in the contact number data field 313 will be copied as an "unknown phone" in a first contact number data field 304 stored on the internal phone book data file. Alternatively, while not shown in FIG. 6, the single name field 312 stored in the smart card phone book may be simply copied to the last name data field 303 such that both the first and last name are stored in the last name data field 303.

Figure 7:
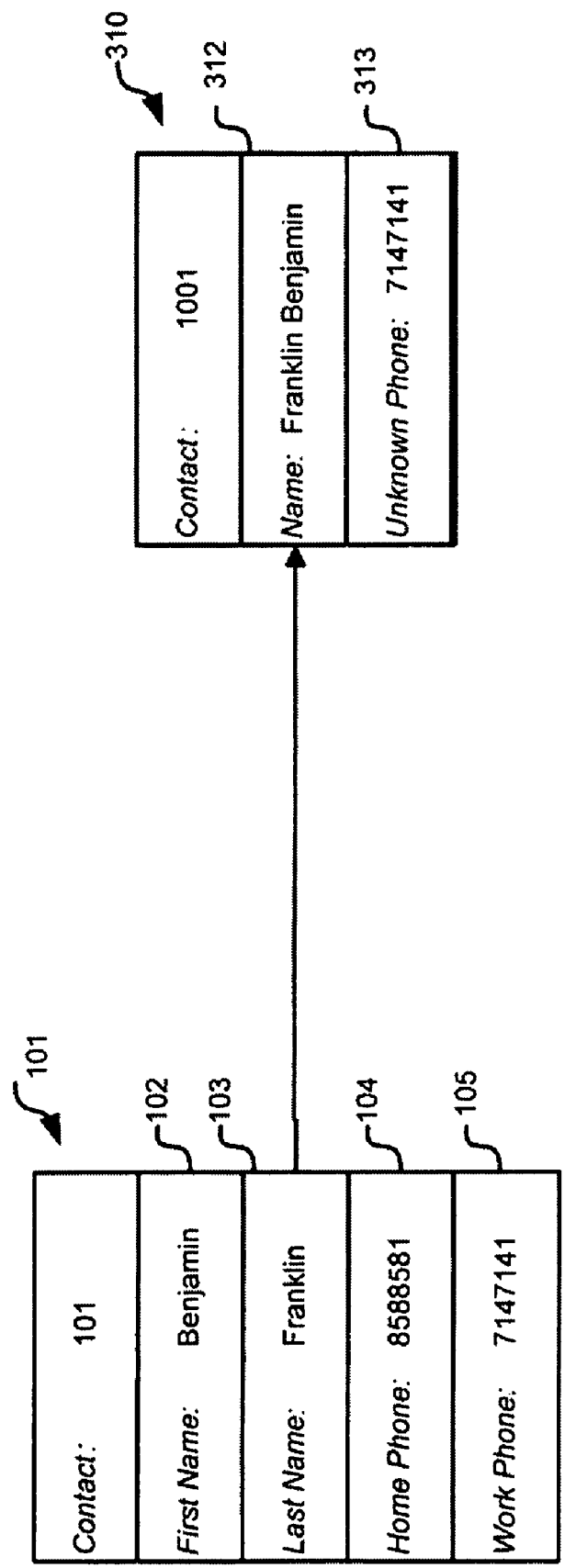
FIG. 7 is a process flow diagram of another alternative implementation of the methods illustrated in FIG. 2 through 5 suitable for implementation on a mobile device.

In another embodiment, each time the user adds a contact record to the internal phone book data file, the synchronization process described above is initiated. The user may elect to copy only the single contact record that was added or may elect to initiate the "copy all" procedure as outlined above. FIG. 7 illustrates the process flow when a new contact record or number is added to the internal phone book data file and synchronized with the smart card phone book data file. As shown in FIG. 7, an internal phone book contact record 301 contains the name "Benjamin" in the first name data field 302, the name "Franklin" in the last name data field 303, a phone number "8588581" in the home phone data field 304 and "7147141" in the work phone data field 305. In this example, when the synchronization process described above is executed it is discovered that a partial duplicate exists on the smart card. Namely, a smart card contact record already exists for the name "Franklin Benjamin" which contains the home phone number "8588581." Consequently, the synchronization process only generates a new smart card contact record 310 for the work phone "7147141." As shown, the new smart card contact record 310 includes the name "Franklin Benjamin" in the name data field 312 and the contact number "7147141" in the contact number data field 313.

Figure 11:
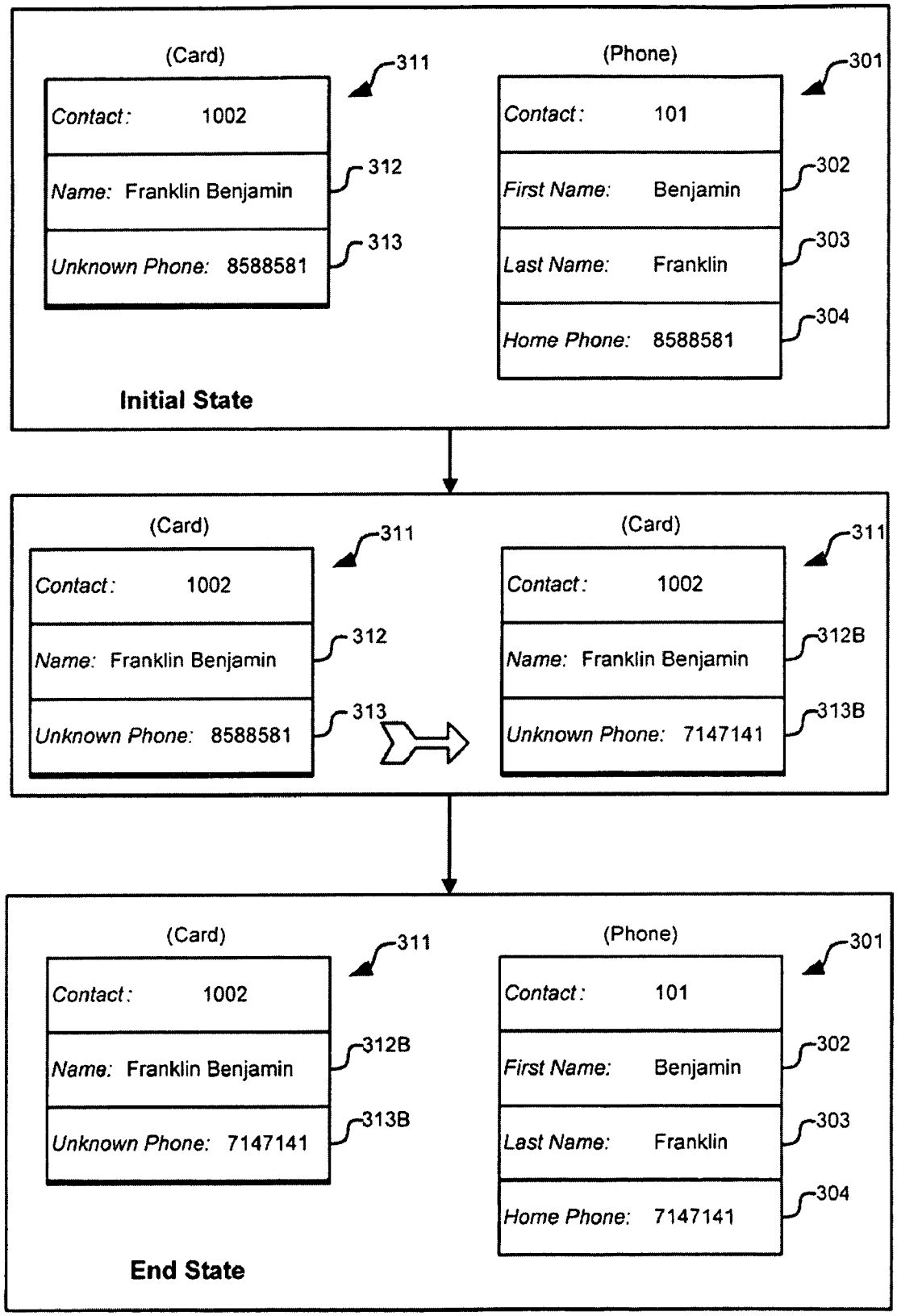
FIG. 11 is a process flow diagram of an embodiment method suitable for implementation on a mobile handset when a contact record is modified on either the smart card or in internal memory.

If a user elects to modify a contact record by editing either the contact numbers stored on the internal memory or the smart card, then the contact number is concurrently modified on the unaltered phone book. Thus, for example, if a contact record exists on both the internal memory and the smart card and the user alters the entry on the smart card, the contact record stored on the internal memory is automatically modified as well. FIG. 11 illustrates the modification process. As shown in FIG. 11 a contact record 301 exists on the internal memory with a first name field 302 ("Benjamin"), a last name field 303 ("Franklin"), and a home phone field 304 ("8588581"). Similarly, the smart card phone book contains a contact record 310, with a single name field 312 ("Franklin Benjamin") and a phone field 313 ("8588581"). If the user changes the phone field 313, for example, on the smart card from "8588581" to "7147141" and presses the save key a duplication process is initiated. The results of the duplication process modifies the contact record 301 stored on the internal memory such that the home phone field 304 is automatically changed to "7147141."

Figure 8A:
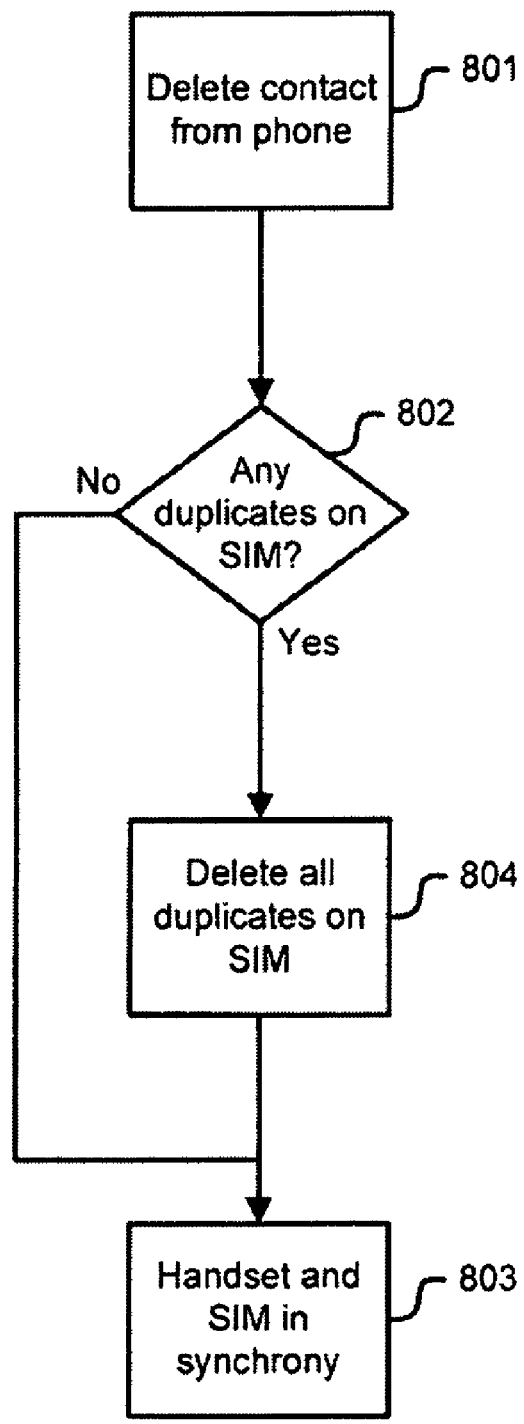
FIG. 8A is a process flow diagram of another alternative implementation of the methods illustrated in FIG. 2 through 5 suitable for implementation on a mobile device.

When a user decides to delete a contact record from either the internal phone book or smart card phone book, a similar action should be taken on the counterpart phone book data file in order to synchronize the contact information. FIG. 8A illustrates the process flow steps taken when a user deletes a contact record from the internal phone book, step 801. Since the phone book stored in an internal memory may contain multiple contact numbers for a single contact record, the processor must seek out all duplicate contact records stored in phone book stored in the smart card for a particular contact name. As such, the processor determines if there are duplicate contact records stored on the smart card, step 802. To determine whether a duplicate exists on the smart card, the logic described above may be implemented. If there are no duplicate contact records on the smart card, then the process completes the synchronization process and awaits the next request to synchronize, step 803. Thus, if a single contact record is deleted from the internal phone book, multiple contact records may be deleted from the smart card phone book. Alternatively, if a single contact number is deleted from a contact record in the internal phone book, a single contact record may be deleted from the smart card phone book. The embodiment process will continue to delete contact records from the smart card until all duplicate records are deleted, step 804. Once all of the contact records are deleted, the process completes the synchronization and awaits the next request to synchronize, step 803.

Figure 8B:
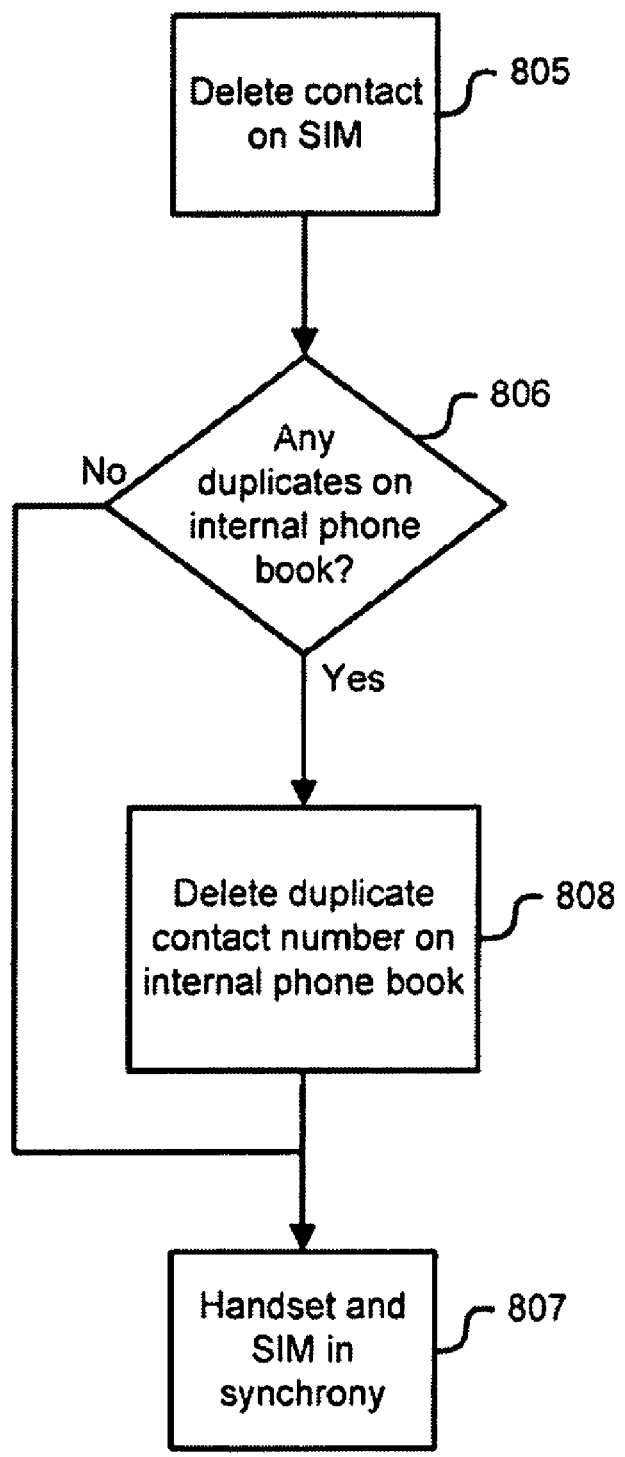
FIG. 8B is a process flow diagram of another alternative implementation of the methods illustrated in FIG. 2 through 5 suitable for implementation on a mobile device.

In contrast, when a user deletes a contact record from the smart card phone book, the processor seeks out any duplicate contact numbers stored in the internal phone book in accordance with the process described above with respect to FIG. 5. If a duplicate contact number is found to exist in the internal phone book, then only the single duplicate contact number is deleted as opposed to the entire contact record. The remaining contact numbers associated with the contact record on the internal phone book are maintained. FIG. 8B illustrates the process flow steps taken when a user deletes a contact record in the smart card phone book. First, the user deletes a contact record from the smart card phone book, step 805. The deleted contact record and associated contact number are stored in a temporary buffer or similar temporary memory unit so that duplicate contact records in the internal memory phone book may be identified. Since the phone book stored in an internal memory may contain multiple contact numbers for a single contact record, the processor seeks to identify any partial duplicate which corresponds with the contact record deleted from the smart card. The processor identifies any partial duplicate contact record stored in the internal memory phone book corresponding to the deleted contact record on the smart card phone book, step 806. The logic described above may be implemented to determine whether a partial duplicate exists on the smart card. If there are no partial duplicate contact records on the smart card, then the process completes the synchronization process and awaits the next request to synchronize, step 807. Otherwise, the processor will delete the contact number corresponding to the partial duplicate from the internal memory phone book, step 808. Once the partial duplicate contact number is deleted, the process completes the synchronization and awaits the next request to synchronize, step 807.

A processor may perform a comparison between the contact records stored in an internal memory and a smart card on a periodic basis or at some specified event. Upon occurrence of either the event or periodic basis, the processor may compare all of the contact records stored on the internal memory with those stored on the inserted smart card. If any discrepancy between the contact records exists, a synchronization process may be initiated so that the user can insure that both phone book records are complete and up to date. In the event the user intended to delete a contact record, rather than copy the contact record, the user may be notified each time a discrepancy between the phone book records exists via the user interface. In this manner, the user may confirm the copying process or deletion process of contact records.

Figure 9:
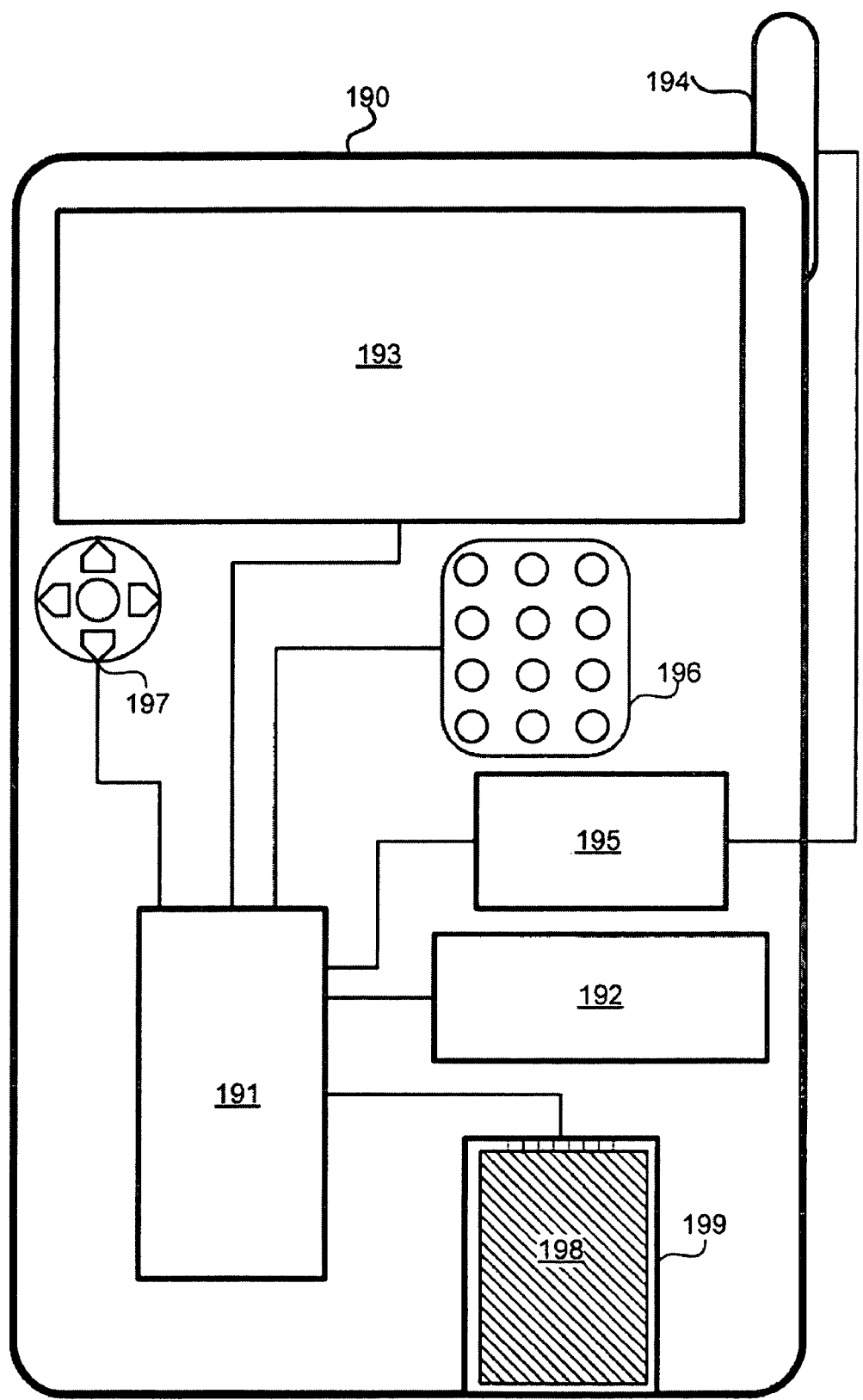
FIG. 9 is a circuit block diagram of an example mobile device suitable for use with the various embodiments.

The embodiments described above may be implemented on any of a variety of mobile devices, such as, for example, cellular telephones, personal data assistance (PDS) with cellular telephone or WiFi capability, mobile electronic mail receivers, mobile web access devices, and other processor equipped devices that may be developed in the future. Typically, such mobile devices will have in common the component's illustrated in FIG. 9. For example, the mobile device 190 may include a processor 191 coupled to internal memory 192 and a display 193. Additionally, the mobile device 190 will have an antenna 194 for sending and receiving electromagnetic radiation that is connected to a wireless data link and/or cellular telephone transceiver 195 coupled to the processor 191. The processor 191 may be any programmable microprocessor, microcomputer or multiple processor chips that can be configured by software instructions to perform a variety of functions, including the functions of the various embodiments described above. Typically, software applications may be stored in the internal memory 192 before they are accessed and loaded into the processor 191. In some mobile devices, the processor 191 may include internal memory sufficient to store the application software instructions. For the purposes of this description, the term memory refers to all memory accessible by the processor 191, including internal memory 192 and memory within the processor 191 itself. User data files, such as the internal memory phone book data file, are typically stored in the memory 192. In many mobile devices, the memory 192 is volatile or nonvolatile memory, such as flash memory. Mobile devices typically include a key pad 196 or miniature keyboard and menu selection buttons or rocker switches 197 for receiving user inputs.

The mobile device 190 of the various embodiments also includes a removable smart card 198 positioned within a smart card receiver slot 199. The smart card receiver slot 199 is configured with electrical contacts to permit the removable smart card 198 to be electrically coupled to the processor 191 when the card is plugged into the mobile device 190.

The various embodiments described above are implemented on a typical mobile device 190 by storing a phone book synchronization application in memory 192 which comprises processor executable software instructions that will cause the processor 191 to execute the embodiment methods described herein.

The hardware used to implement the forgoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a handset are intended to encompass any one or all memory modules within the handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for synchronizing contact record data between a source phone book data file and a target phone book data file, comprising:

selecting a contact record name and associated contact number in the source phone book for deletion;

storing the selected contact record name and associated contact number in a temporary memory;

determining an acceptable form for storing the contact record name on the target phone book;

dynamically determining a maximum character length for the acceptable form for storing the contact record name on the target phone book;

converting the selected contact record name stored in the temporary memory into the acceptable form by performing at least one of a concatenation operation or a divide operation on character strings of the selected contact record name to generate a converted contact name having at least one string with a character length that is less than or equal to the determined maximum character length;

comparing the converted contact name to all contact names stored in the target phone book to determine if a match exists;

comparing the associated contact number with only those target phone book contact numbers associated with matched contact names in the target phone book to determine if a duplicate contact record exists;

deleting the associated contact number from the source phone book; and deleting the contact number associated with the matched contact names from the target phone book only if the duplicate contact record exists.

2. The method of claim 1, wherein:

converting the selected contact record name comprises converting a separate first and last name field into a single name field.

3. The method of claim 1, wherein:

converting the selected contact record name comprises converting a single name field into a separate first and last name field.

4. The method of claim 1, wherein the method is initiated whenever a smart card is inserted into the mobile device.

5. The method of claim 1, further comprising deleting the matched contact record name when the target phone book is a smart card phone book.

6. The method of claim 1, further comprising deleting the matched contact record name when the target phone book is an internal memory phone book and no other contact numbers are associated with the matched contact record name.

7. The method of claim 1, further comprising deleting the selected contact record name from the source phone book when the source phone book is an internal memory phone book and no other contact numbers are associated with the selected contact record name.

8. A mobile device comprising:

a memory having stored therein a phone book data file containing a plurality of internal contact records;

a smart card having stored therein a smart card phone book containing a plurality of smart card contact records; and a processor coupled to both the memory and smart card, wherein the processor is configured with processor-executable instructions to perform operations comprising:

selecting a contact record name and associated contact number in a source phone book for deletion;

storing the selected contact record name and associated contact number in a temporary memory;

determining an acceptable form for storing the contact record name on the target phone book;

determining a maximum character length for storing the contact record name on the target phone book;

converting the selected contact record name stored in the temporary memory into the acceptable form by performing at least one of a concatenation operation or a divide operation on character strings of the selected contact record name to generate a converted contact name having a character length that is less than or equal to the determined maximum character length;

comparing the converted contact name to all contact names stored in the target phone book to determine if a match exists;

comparing the associated contact number with only those target phone book contact numbers associated with any matched contact name in the target phone book to determine if a duplicate contact record exists;

deleting the associated contact number from the source phone book; and deleting the contact number associated with the matched contact names from the target phone book only if the duplicate contact record exists.

9. The mobile device of claim 8, wherein the processor is further configured with processor-executable instructions such that converting the selected contact record name comprises converting a separate first and last name field into a single name field.

10. The mobile device of claim 8, wherein the processor is further configured with processor-executable instructions such that converting the selected contact record name comprises converting a single name field into a separate first and last name field.

11. The mobile device of claim 8, wherein the processor is further configured with processor-executable instructions such that the operations are performed whenever a smart card is inserted into the mobile device.

12. The mobile device of claim 8, wherein the processor is further configured with processor-executable instructions to perform operations comprising deleting the matched contact record name when the target phone book is a smart card phone book.

13. The mobile device of claim 8, wherein the processor is further configured with processor-executable instructions to perform operations comprising deleting the matched contact record name when the target phone book is an internal memory phone book and no other contact numbers are associated with the matched contact record name.

14. The mobile device of claim 8, wherein the processor is further configured with processor-executable instructions to perform operations comprising deleting the selected contact record name from the source phone book when the source phone book is an internal memory phone book and no other contact numbers are associated with the selected contact record name.

15. A mobile device, comprising:
means for selecting a contact record name and associated contact number in a source phone book for deletion;
means for storing the selected contact record name and associated contact number in a temporary memory;
means for determining an acceptable form for storing the contact record name on the target phone book;
means for determining a maximum character length for storing the contact record name on the target phone book;
means for converting the selected contact record name stored in the temporary memory into the acceptable form by performing at least one of a concatenation operation or a divide operation on character strings of the selected contact record name to generate a converted contact name having a character length that is less than or equal to the determined maximum character length;
means for comparing the converted contact name to all contact names stored in the target phone book to determine if a match exists;
means for comparing the associated contact number with only those target phone book contact numbers associated with matched contact names in the target phone book to determine if a duplicate contact record exists;
means for deleting the associated contact number from the source phone book; and
means for deleting the contact number associated with the matched contact names from the target phone book only if the duplicate contact record exists.

16. A non-transitory processor readable storage medium having stored thereon processor executable software instructions configured to cause a mobile device processor to perform steps comprising:
selecting a contact record name and associated contact number in a source phone book for deletion;
storing the selected contact record name and associated contact number in a temporary memory;
determining an acceptable form for storing the contact record name on the target phone book;
determining a maximum character length for storing the contact record name on the target phone book;
converting the selected contact record name stored in the temporary memory into the acceptable form by performing at least one of a concatenation operation or a divide operation on character strings of the selected contact record name to generate a converted contact name having a character length that is less than or equal to the determined maximum character length;
comparing the converted contact name to all contact names stored in the target phone book to determine if a match exists;
comparing the associated contact number with only those target phone book contact numbers associated with matched contact names in the target phone book to determine if a duplicate contact record exists;
deleting the associated contact number from the source phone book; and
deleting the contact number associated with the matched contact names from the target phone book only if the duplicate contact record exists.

17. The non-transitory processor readable storage medium of claim 16, wherein the stored processor executable software instructions are configured to cause the mobile device processor to further perform steps comprising converting a separate first and last name field into a single name field.

18. The non-transitory processor readable storage medium of claim 16, wherein the stored processor executable software instructions are configured to cause the mobile device processor to further perform steps comprising converting a single name field into a separate first and last name field.

19. The non-transitory processor readable storage medium of claim 16, wherein the stored processor executable software instructions are configured to cause the mobile device processor to further perform steps comprising initiating the synchronization process whenever a smart card is inserted into the mobile device.

20. The non-transitory processor readable storage medium of claim 16, wherein the stored processor executable software instructions are configured to cause the mobile device processor to further perform steps comprising deleting the matched contact record name when the target phone book is a smart card phone book.

21. The non-transitory processor readable storage medium of claim 16, wherein the stored processor executable software instructions are configured to cause the mobile device processor to further perform steps comprising deleting the matched contact record name when the target phone book is an internal memory phone book and no other contact numbers are associated with the matched contact record name.

22. The non-transitory processor readable storage medium of claim 16, wherein the stored processor executable software instructions are configured to cause the mobile device processor to further perform steps comprising deleting the selected contact record name when the source phone book is an internal memory phone book and no other contact numbers are associated with the selected contact record name.

* * * * *